April 3, 1973  W. B. INNES  3,725,005
ANALYSIS OF REACTIVE MATERIALS IN GAS STREAMS
Filed Nov. 3, 1970  4 Sheets-Sheet 1
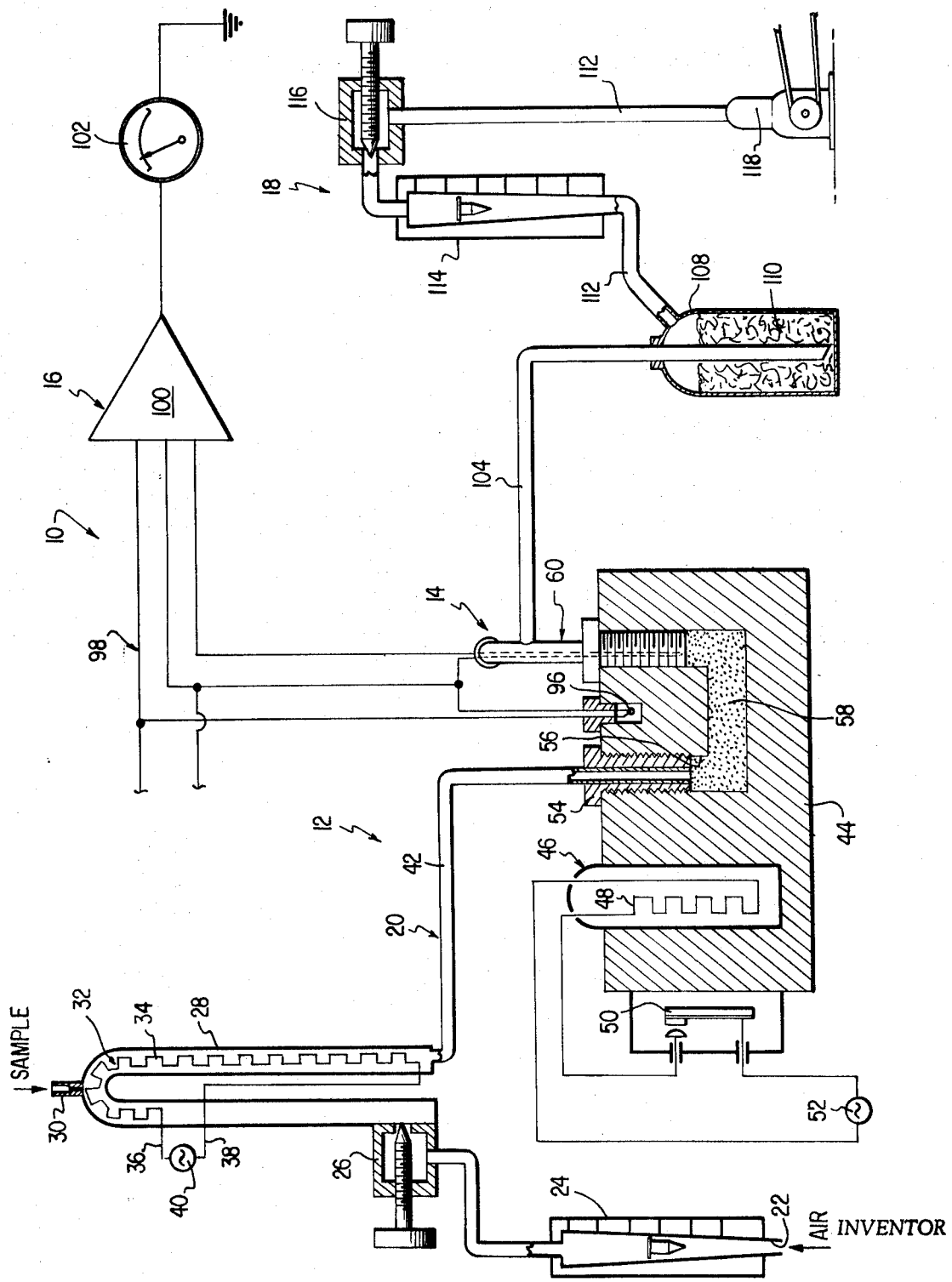
FIG. I
INVENTOR
WILLIAM B. INNES
*Colton + Stone*
ATTORNEYS.

INVENTOR
WILLIAM B. INNES

ATTORNEYS.

FIG. 5
(PRIOR ART)
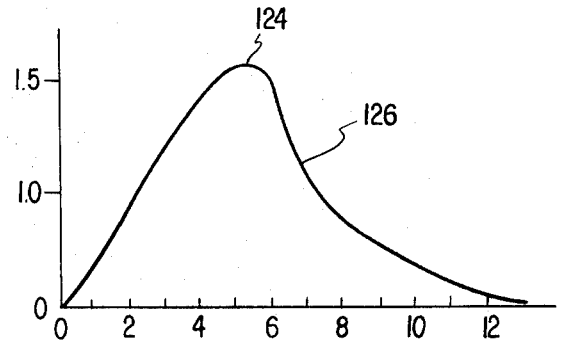
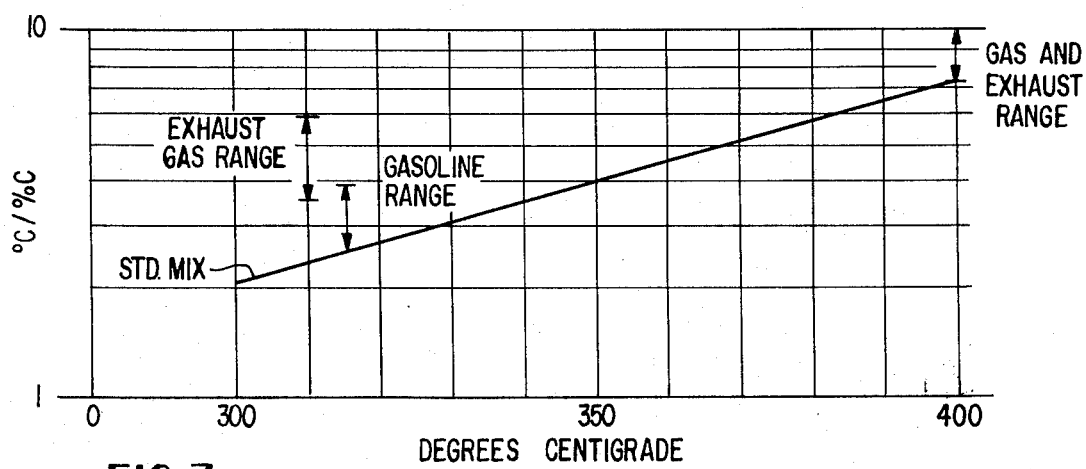
FIG. 7
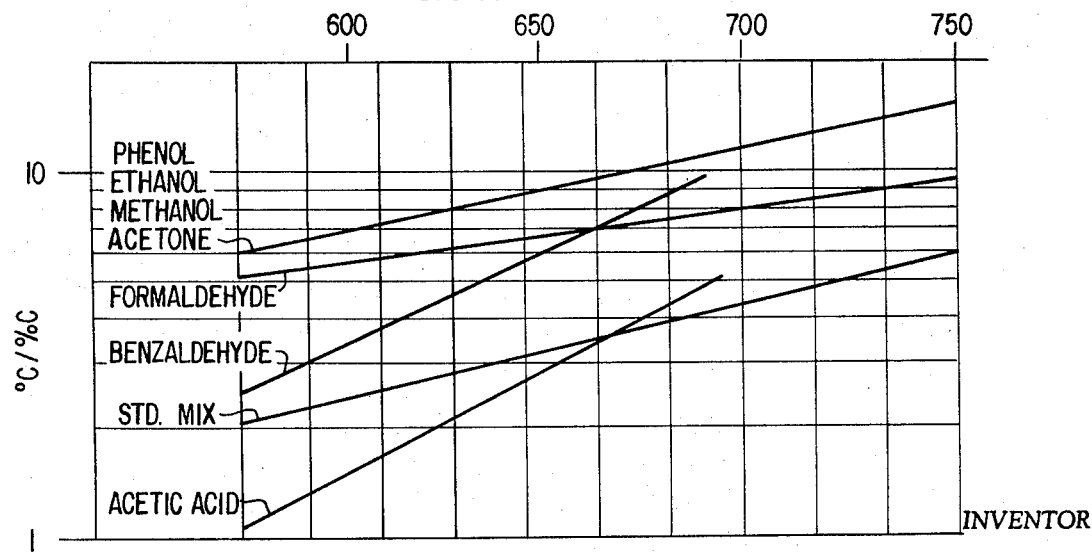
FIG. 8
INVENTOR
WILLIAM B. INNES
*Calton + Stone*
ATTORNEYS.

United States Patent Office 3,725,005
Patented Apr. 3, 1973

3,725,005
ANALYSIS OF REACTIVE MATERIALS IN
GAS STREAMS
William B. Innes, 724 Kilbourne Drive,
Upland, Calif. 91786
Continuation-in-part of applications Ser. No. 658,786,
Aug. 7, 1967, and Ser. No. 748,109, June 3, 1968, now
Patent No. 3,537,823. This application Nov. 3, 1970,
Ser. No. 86,481
The portion of the term of the patent subsequent to
Nov. 3, 1987, has been disclaimed
Int. Cl. G01n 31/10, 31/12, 33/22
U.S. Cl. 23—232 E                    12 Claims

ABSTRACT OF THE DISCLOSURE

A method and apparatus for determining the amount of reactive constituents in a gas sample is disclosed. Air is mixed with a sample and passed through a suitable oxidation catalyst for oxidizing the constituent. The temperature rise in the catalyst is proportional to the concentration of the constituent in the sample and is measured immediately adjacent the inlet to the bed. The temperature of the air and sample is maintained above the dew point thereof to prevent condensation of water and absorption of reactable components therein. Provisions are made to prevent sorption of reactable components in the inlet line upstream of the reactive bed.

REFERENCE TO RELATED APPLICATIONS

This application is a continuation-in-part of application Ser. No. 658,786, filed Aug. 7, 1967, now U.S. Pat. No. 3,547,587, issued Dec. 15, 1970 and application Ser. No. 748,109, filed June 3, 1968, now U.S. Pat. 3,537,823, issued on Nov. 3, 1970, the disclosures of which are incorporated herein by reference.

BACKGROUND OF THE INVENTION

In application Ser. No. 658,786 it was disclosed that a slug of reactive organic material could be catalytically reacted under conditions such that the temperature rise in the catalyst bed was proportional to the quantity of reacted ingredients in the slug. This was accomplished by controlling the flow rate through the catalytic bed, regulating the initial temperature thereof, and selecting the appropriate catalyst.

It is the purpose of this invention to apply certain techniques learned during the development of the aforementioned disclosures to a continuous analysis approach of the type disclosed in U.S. Pat. 1,578,666. In this patent a gas sample is mixed with a combustion supporting gas and passed continuously through a catalytic bed where the temperature rise is measured to determine the quantity of a reactive component in the sample. One of the major problems associated with the approach disclosed in this patent is the long period required for the catalytic bed to achieve a steady state temperature rise above the background temperature and the inordinate length of time, after sample termination, for the temperature of the catalytic bed to fall to the background temperature.

SUMMARY OF THE INVENTION

It is an object of this invention to provide a continuous method and apparatus for determining the quantity of reactable organic compounds in a gas sample.

Another object of the invention is to provide a method and apparatus for determining the amount of a reactive organic material in a gas sample by catalytically reacting the sample and measuring the temperature rise in the catalyst to provide the capability of rapidly analyzing the sample.

In summary, the process of this invention comprises mixing readily oxidizable material such as a reactive organic material and an amount of combustion supporting gas sufficient to support substantially complete oxidation thereof, continuously passing the mixture at .3–10 cubic feet per hours through a reactor having a cross-sectional area between .003 and .018 square inch having therein a catalyst for oxidizing the material until the temperature of the catalyst reaches substantial equilibrium and measuring the temperature rise in the range of 0–20° C. in the catalyst with a probe positioned downstream of the reactor inlet a distance of .03–.30 inch.

In summary, the device of this invention comprises conduit means for receiving a combustion supporting gas, means for injecting a sample of a gaseous organic compound into the conduit means, a reactor having a catalyst therein in communication with the conduit means for oxidizing the reactive organic compound including a heater for maintaining the reactor at a predetermined temperature prior to oxidation of the organic compound, means for measuring the temperature rise in the reactor resulting from the oxidation of the organic compound and heater means for elevating the temperature of the compound and combustion supporting gas above the dew point thereof.

BRIEF DESCRIPTION OF THE DRAWINGS

FIG. 1 is a largely schematic view of the apparatus of this invention;

FIG. 5 is a typical response curve of the prior art steady state analytical approach; and FIGS. 6–8 depict temperature rise data from oxidizing various reactive materials at various operating temperatures.

DETAILED DESCRIPTION OF THE PREFERRED EMBODIMENT

Figure 4:
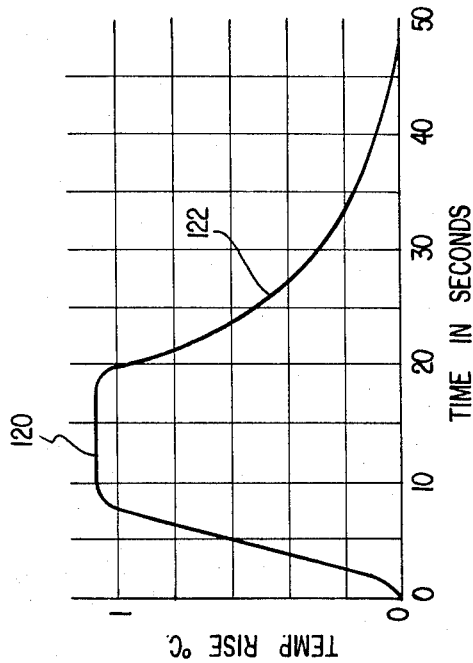
FIG. 4 is a typical response curve plotting the temperature rise in the catalyst bed against time during the practice of this invention.

Referring to FIG. 1, there is illustrated a device 10 for determining the amount of reactive gaseous organic compounds in a gas sample which comprises as major components means 12 for preparing the sample, means 14 for oxidizing the sample, means 16 for measuring the temperature rise caused by the oxidation process and means 18 for moving the sample through the device 10 and disposing of the oxidized sample.

The sample preparation means 12 comprises conduit means 20 having an inlet 22 for receiving a combustion supporting gas such as air. A suitable meter 24 may conveniently be used to measure the quantity of incoming air and a control valve 26 is desirably provided to adjust the flow rate through the conduit means 20. The conduit means 20 includes a tube 28 having a sample inlet 30 including a restriction therein, such as an orifice of reduced size, for adding a sample of the gaseous organic material to the combustion supporting gas passing through the conduit means 20.

A convenient sample probe may be provided by clipping the end of sample line 30 in a vehicle exhaust pipe and a needle restrictor therein. A filter, such as a detachable glass wool containing cartridge, may be provided upstream of the restrictor for removing particulates from the sample. It is desirable to remove all particulates to avoid sorbing reactive materials in the conduit section 42. A restrictor of given size and length provides a constant sample/air ratio without compensating for the effect of exhaust gas velocity and without measuring the flow rate of both air and sample.

If the material to be sampled is obtained in liqiud form, a conventional bubbler may be provided to aspirate air therethrough to obtain a saturated gas sample for continuous injection into the sample inlet 30. If the organic material to be analyzed is available in gaseous form, the sample may be passed directly into the inlet 30.

An important part of this invention resides in heater means 32 for elevating the temperature of the sample and the combustion supporting gas above the dew point thereof. Although the heater means 32 may be of any desirable type, it is preferably an electrical resistance element 34 positioned within the tube 28 and connected by a suitable means 36, 38 to a source 40 of the electrical energy. As will become more apparent hereinafter, the provision of the heater means 32 prevents condensation of water in the tube 28 and in the conduit section 42 leading to the oxidizing means 14. If water is allowed to condense in the tube 28 downstream of the sample inlet 30 or in the conduit section 42, organic material in the sample will be absorbed in the condensed water leading to slow response times, slow recovery times and imprecise steady state maximum temperature levels, as is evidenced by the temperature rise measuring means 16. A temperature of, for example, 100° C. is satisfactory.

Another important feature of this invention is that the conduit section 42 is made of a material incapable of sorbing the organic materials in the sample. This is of substantial importance in providing rapid response times, rapid recovery times and a satisfactory plateau in the temperature rise sensed by the measuring means 16. Since it is desirable that the conduit section 42 be flexible for purposes of assembly, the conduit section 42 and the tube 28 are conveniently made of tetrafluoroethylene or nylon tubing. Neoprene is acceptable as a non-sorbing material for the conduit section 42 but is not as good as tetrafluoroethylene.

The oxidizing means 14 includes a reactor block 44 of high heat conductivity and may conveniently be aluminum. A heater 46 is provided to heat the block 44 to a predetermined constant temperature, preferably in the range 550–900° F. The heater 46 may be of any suitable type and is illustrated as comprising a resistive element 48 in heat transmitting relation to the block 44 and a bimetallic switch 50 in circuit with the resistive element 48 and a source of electrical energy 52 for controlling the temperature of the block 44.

The conduit section 42 terminates in a fitting 54 threadably received in one leg of a U-shaped passage 56 provided in the block 44. A permeable heat conductive material 58, such as granular aluminum, is disposed in the passage 56 for transmitting heat to the sample-air mixture passing therethrough. It will accordingly be seen that the sample and oxidation supporting gas are heated to the predetermined constant temperature of the reactor block 44.

Figure 2:
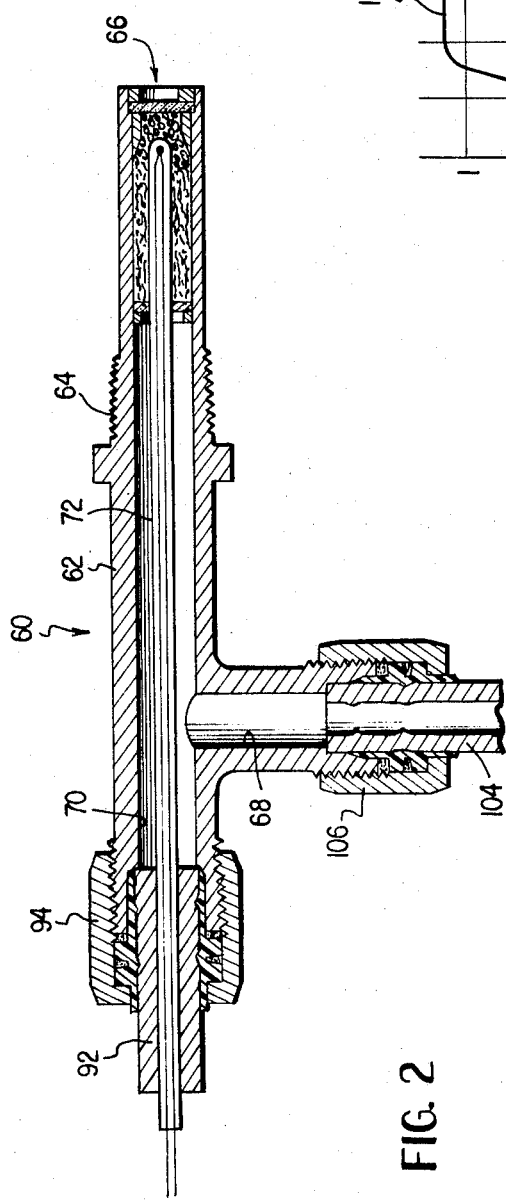
FIG. 2 is an enlarged cross-sectional view of the reactor used in the apparatus in FIG. 1.
Figure 3:
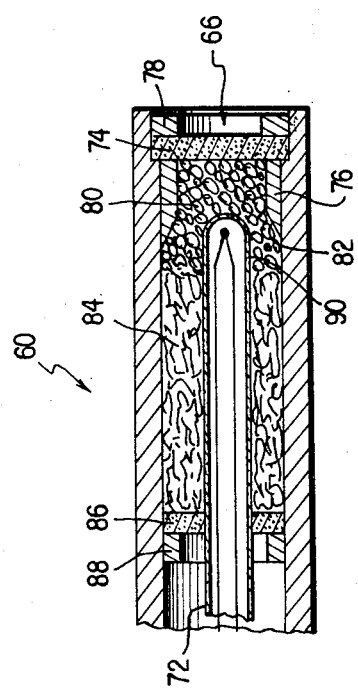
FIG. 3 is an enlarged cross-sectional view of the end of the reactor of FIG. 2.

The oxidation of the sample takes place in a reactor 60, illustrated in FIGS. 2 and 3, comprising a metallic tubular generally Y-shaped body 62 having a threaded portion 64 adjacent the lower end thereof for securement to the other leg of the passage 56. The reactor 60 comprises a gas inlet 66, a gas outlet 68 and an outlet 70 for a temperature probe 72 as will be more fully apparent hereinafter. The reactor 60 comprises a non-catalytic permeable grid 74 positioned in the inlet 66 by a sleeve 76 and a snap ring 78 to retain a catalytic bed 80 in the lower end of the reactor 60. The sleeve 76 has a bevel 82 adjacent the terminus of the probe 72 and acts to partially define the catalyst chamber such that the catalyst is concentrated immediately adjacent the terminus of the probe 72. A pyrex wool buffer 84 is positioned above the catalyst 80 and acts as a shock absorber to minimize mechanical damage to the catalyst. A permeable grid 86 is positioned above the buffer 84 and is held in place a snap ring 88.

As will be explained more fully hereinafter, an important characteristic of this invention is the size of the bore through the reactor 60, or more precisely, the cross-sectional area of the catalyst chamber provided by reactor 60. The cross-sectional area of the catalyst chamber below the bevel not substantially different than the flow area provision of the sleeve 76 provides a flow area below the bevel not substantially different than the flow area around the bottom of the temperature probe 72.

The temperature probe 72 is of any suitable type and is illustrated as comprising a ceramic coated thermocouple tip 90 positioned in the catalyst 80. The probe 72 is conveniently circular, is positioned centrally in the catalyst 80 and encompasses not more than about 60% of the diameter of the flow passage through the body 62. The latter is of some importance since smaller flow areas in the catalyst bed generate a high pressure drop across the catalyst bed 80 which may cause considerable turbulence therein tending toward mechanical damage to the catalyst. As will be apparent hereinafter, the thermocouple tip 90 is closely adjacent the reactor inlet 66 and is desirably in the range of .03–.30 inch therefrom and preferably between .08–.20 inch therefrom. This may alternatively be expressed in terms of catalyst volume upstream of the probe in the range .004–.2 cubic centimeter. The other end of the probe 72 passes through a section 92 of brass tubing which is attached in the probe outlet 70 by a conventional fitting 94. The second thermocouple junction 96 is in heat receiving relation to the block 44 and is connected through a suitable electrical network 98 to an ampilfier 100 and a meter 102 in a conventional manner. The temperature difference between the catalyst bed 80 and the block 44 is determined from the voltage difference between the thermocouple junctions 90, 96 which is amplified by the amplifier 100 and read out on the meter 102 as is well known in the art.

The air and sample moving means 18 includes a conduit section 104, comprising part of the conduit means 20, connected to the gas outlet 68 of the reactor 60 as by use of a conventional fitting 106. The conduit section 104 leads to a filter arrangement 108 including a suitable reversible desiccant 110 such as silica-gel for removing reaction products which may be injurious to the downstream elements. A conduit section 112, also comprising part of the conduit means 20, connects the filter arrangement 108 to a suitable meter 114, a control valve 116 and a suction pump 118. As should be apparent, one of the considerations in the device of this invention is the avoidance of sorption of the reactable organic materials in the inlet line. Toward this end, the pump 118 is disposed adjacent the terminus of the conduit means 20 to avoid sorbing the reactive organic materials on the components of the pump 118. Positioning the pump 118 near the discharge of the conduit means 20 also prevents pump lubricants and the like from entering the conduit section 42 thereby avoiding sorption of reactive material thereon.

In the overall operation of this invention, the pump 118 is operated to draw sufficient air through the inlet 22 to support significant oxidation of the reactable materials in the sample which is introduced through the inlet 30 simultaneously with air introduction. The sample/air ratio may vary widely from sample to sample but must remain constant during the analysis of any particular sample. The sample/air ratio may be controlled by regulation of the valves 26, 116 in conjunction with readings from the meters 24, 114. At sample/air ratios above 1:1, substantial coking of the catalyst was noted which leads to slow response and recovery times and a diminished magnitude of response. The only limit on low sample/ air ratios is the magnitude of response which, of course, falls as the sample is more diluted with air. The present optimum sample/air ratio is 1:7, although much higher ratios are feasible. The ratio of sample to air and/or the temperature of the heater means 32 is regulated to assure that the sample-air mixture are above the dew point to prevent formation of condensate in the conduit section 42. The block heater 46 is operated to maintain a predetermined elevated temperature to heat the incoming stream of air and sample to a constant predetermined temperature in the range of 550–900° F. As the air-sample stream passes into the reactor inlet 66, the reactable organic materials oxidize under the influence of the catalyst 80 and, because of the heat of reaction thereof, create a temperature differential between the catalyst bed 80 and the reactor block 44. This temperature differential is detected by the measuring means 16 and read out by the meter 102. The exhaust gas emits from the reactor 60 and passes through the filter arrangement 108 and the pump 80 to the atmosphere.

A typical response curve during operation of this invention is illustrated in FIG. 4 where the temperature rise in the catalyst bed 80 is plotted against time. The time necessary to reach 90% of the steady state or plateau reading 120 is called the response time. The duration of the plateau reading 120 may be controlled by terminating the addition of sample to the inlet 30. The plateau rating 104 may be continued for as long as desired, but for purposes of obtaining reliable results and running a large number of samples, it is preferred that the duration be on the order of about 10 seconds. Upon cessation of sample injection, continuation of air injection and the lapse of a few seconds, the temperature of the thermocouple junction declines along the curve 122 toward the base line temperature reading. The curve 122 illustrates a somewhat slow recovery time which is termed a tailing effect discussed hereinafter. The time required for the thermocouple junction to drop 90% of the temperature increase toward the base line temperature is called the recovery time.

The typical response curve of this invention should be contrasted with a typical response curve of the steady state analytical approach disclosed in U.S. Pat. 1,578,666 illustrated in FIG. 5. It is immediately apparent that the response and recovery times of this prior art approach are so long as to be impractical for many purposes and at a serious disadvantage for all applications. For example, in adjusting an internal combustion engine to produce minimal emissions, it is imperative that the mechanic have results quite rapidly. There are two basic reasons why the response and recovery times of the prior art are so long. The first is a combination of the size of the catalyst chamber and the placement of the temperature probe therein. As will be shown hereinafter, the size of the reactor bore has a substantial effect on the response and recovery times. The second reason is that no provisions are provided by the approach of the aforementioned patent to prevent sorption of the reactable organic components in the inlet line. It will be appreciated by those skilled in the art that a build-up of reactable organic materials in the inlet line requires an appreciable length of time in order to achieve a steady state situation in the catalyst bed. Furthermore, the desorption of reactable organic materials from the inlet system may provide an erratic plateau 124. After sample termination and continuation of air injection through the prior art device, a substantial length of time is required to purge the inlet line of organic material sorbed during the previous test.

Some of the characteristics for methods and apparatus of this type that should be considered include the magnitude of thermal response as a function of the operating parameters, the linearity and additivity of thermal response contributed by various reactive components, the reversible decrease of thermal response with usage, the irreversible decrease of response with usage, the selectivity of response as correlated against photochemically reactive organic compounds, the time required to attain a steady state thermal response, the time required to recover to the base line temperature and the selectivity of response for hydrocarbons as opposed to carbon monoxide and hydrogen. The major parameters that can effect these characteristics include the nature of the sampling system, the ratio of combustion supporting gas to the sample, the total flow rate, the temperature of the reactor, the nature of the catalyst, the nature of the probe, the geometry of the reactor and the placement and size of the temperature probe in the catalyst bed. The effect of these parameters is complex and examples of this invention are conveniently discussed under the heading of the various instrument characteristics below.

Magnitude of response

This characteristic is conveniently discussed in terms of catalyst bed temperature rise per unit concentration of organic carbon (at low concentration levels) for a reactor having a ⅛ inch bore for various reactor temperatures, flow rates, catalysts and probe positions as shown in Table I.

The effect of these variables on the response obtained using a standard mixture of equal molar amounts of butene-1, propene and n-butane is illustrative of the effect of these variables on typical compounds. It will be noted that the magnitude of response increases markedly with temperature in the range 500–675° F. Any temperature over 500° F. would appear to give adequate response for the practice of this invention, although higher reactor temperatures are obviously preferred.

Decreased flow rate increases the plateau response so that a decrease from 1.5 to 0.5 cubic feet per hour of air flow generally gives a response increase equivalent to about 30° F. At higher temperatures, the effect of decreasing flow rates is less pronounced. Flow rates up to about 10 cubic feet per hour appear feasible at higher temperatures provided the pump 118 is of a suitable type.

The position of the thermocouple tip 90 in the range tested (.08–.20 inch) from the reactor inlet 66 does not appear to have much effect on response although response is higher for .20 inch. Values as low as one particle layer of catalyst, about .03 inch, ahead of the thermocouple tip 90 are feasible.

This problem is not as severe in practice as the results of Table II might indicate. The primary reason is that the

TABLE I.—INITIAL RESPONSE TO STANDARD HC MIX

| | Catalyst | | | | | | | |
|---|---|---|---|---|---|---|---|---|
| | Vanadia-alumina [c] | | | Chromia-alumina [*,d] | Chromia [*,e] | | | Vanadia [f] |
| Flow rates, c.f.h. | 1.0 | 0.5 | 1.5 | 1.5 | 0.5 | 1.5 | | 1.0 |
| Probe position [a] | 0.8 | 0.8 | .20 | .08 | .20 | .20 | .20 | .20 | .08 |

° C. temperature rise from 1 mol percent C from: [b] ⅓ butene-1, ⅓ propene, ⅓ n-butane

| Catalyst temp., ° F.: | | | | | | | | |
|---|---|---|---|---|---|---|---|---|
| 450 | | | | | 1.4 | | 1.4 | |
| 500 | | 1.6 | 1.0 | 1.3 | 1.8 | | 1.8 | |
| 550 | | 2.3 | 1.45 | 1.75 | 2.9 | | 2.9 | |
| 575 | | 2.8 | 1.8 | 2.1 | 4.7 | 5.3 | 4.7 | |
| 600 | 2.6 | | 3.3 | 2.1 | 2.3 | | | 1.0 |
| 625 | | 3.2 | 4.0 | 2.6 | 2.8 | | | |
| 650 | 3.5 | 4.0 | 4.8 | 3.3 | 3.6 | | | |
| 700 | 4.8 | 5.6 | 6.0 | 5.6 | 5.0 | | | 2.0 |
| 750 | 6.3 | | | | | | | |
| 800 | 10.0 | | | | | | | |

[a] Distance in inches between catalyst bed inlet and tip of 1/16" diameter probe centrally located in ⅛" diameter bed of 20–100 mesh catalyst.
[b] Air and nitrogen used as diluent.
[c] Prepared by multiple impregnation of Kaiser Grade 101 alumina with ammonia meta vanadate as detailed in U.S. application Serial No. 748,109 to give a surface area of 200 m.²/g. and 15% $V_2O_5$ content.
[d] Prepared by calcination of $NH_4CrO_4$ solution at 800° F. giving a surface area of 10±5 m.²/g.
[e] Prepared by impregnation of Kaiser Grade 101 alumina with $NH_4CrO_4$ and calcination to 1,000° F. to give 19.5% $Cr_2O_3$ and 310 m.²/g. surface area.
[f] Prepared by calcination of $NH_4VO_3$ to 800° F. and screening to 90–100 mesh to give a surface area of 10±5 m.²/g.
*Values on chromia containing catalyst showed decreasing response for successive samples, but recovered with time. Initial values are given.

Reversible decrease of response with continued usage

Any appreciable decrease of response with usage leads to lack of reproducibility and a lower steady state temperature rise when tests are repeatedly promptly. Any decrease of this type is, of course, unsatisfactory. This type of decrease has been noted when analyzing aromatic hydrocarbons with vanadia catalysts and when analyzing C4 olefins when using a chromia catalyst. Examples in terms of time requirement for recovery of catalytic activity are given in Table II. For example, after running a toluene sample at a .20 inch probe placement and a 625° F. catalyst temperature, one should wait about 2 minutes for a vanadia-alumina catalyst to recover its activity before analyzing the next sample.

The results obtained indicate that there is appreciable activity decline for aromatics when using a vanadia catalyst up to about 600° F. For a chromia catalyst, the reproducible testing of C4 olefins would appear to require a catalyst temperature above 640° F. The placement of the probe nearer the gas inlet appears to lower the operating temperature requirement slightly. The results shown in Table II indicate that high temperatures in the catalyst bed will substantially minimize this problem.

results of Table II were obtained with the aromatic being the only reactable organic material in the sample. This phenomena is believed to be related to the effect of sorbed reaction products on the catalyst. Since concentrated aromatic samples are not normally obtained in practice, recovery times are generally substantially shorter.

TABLE II.—REVERSIBLE DEACTIVATION BY HC EXPOSURE IN TERMS OF SUBSEQUENT TIME REQUIRED TO APPROACH INITIAL RESPONSE WITH STANDARD MIX

| | Catalyst | | | | | | | |
|---|---|---|---|---|---|---|---|---|
| | Vanadia-alumina [c] | | Chromia-alumina [c] | | Chromia [c] | | Vanadia [c] | |
| HC poison [a] | Toluene | Xylene | Toluene | Butene | Toluene | Butene | Toluene | |
| Probe position= | .08 | .20 | .08 | .20 | .20 | .20 | .20 | .20 | |

Time for recovery to 95% of initial response in minutes after first exposure

| Catalyst temp., ° F.: | | | | | | | | |
|---|---|---|---|---|---|---|---|---|
| 450 | | | | | | | 60 | |
| 500 | | | | | | | | |
| 550 | >60 | | | | | | | |
| 575 | >4 | <3 | | | | | | |
| 600 | <2 | <2 | | | | 5 | 5 | |
| 625 | 5 | <2 | 50 | <12 | <8 | | | |
| 650 | 2 | <2 | 3 | <10 | <5 | | | |
| >675 | <1 | <2 | | | | | | <3 |

[a] 150 cc. 2.3% toluene, 150 cc. .35% C butene, 150 cc. 1.5% C xylene.
[b] Distance in inches between catalyst inlet and tip of thermocouple probe for ⅛" bore reactor.
[c] See Table I for details on catalyst.

Response times and recovery

Slow establishment of a steady state surface conditions in the catalytic bed would be expected to lead to a slow attainment of temperature plateau ratings upon a sample injection or recovery to the temperature base line when the sample gas is replaced with air. Slow response obviously makes it more difficult to use an instrument of this type when samples must be run at close intervals, as when adjusting the engine of a vehicle.

Until the rector bore is reduced to a diameter under about .15 inch it appears that response and recovery times are primarily limited by heat transfer factors. Table III illustrates the effect of reactor bore size when there are no complications and indicates that the reactor bore should be about ⅛ inch or smaller for flow rates in the range .5–2.0 cubic feet per hour in order to attain response and recovery times less than about 10 seconds.

Surprisingly, a pressure drop of 10 inches of water is all that is required to achieve 1.0 c.f.h. flow rate through a ⅛ inch diameter reactor. Below about .10 inch, the problem of reactor pressure drop becomes significant and a more expensive pump is required. Since there is a significant decrease in the magnitude of response with reductions in bore diameters, the optimum bed diameter is about .10 inch providing a response time of about 5 seconds which is acceptable for most purposes. At decreasing bed diameters below .06 inch, the magnitude of response drops off substantially.

Accordingly, the time for response and recovery with $V_2O_5$-$Al_2O_3$ catalysts was quite satisfactory (in the range of 5 to 10 seconds) when sufficient oxygen was present while operating with a small bore (.08–.12″ diameter) reactor providing the inlet system was designed to prevent condensation or sorption of reactive ingredients in the inlet system. An exception is C7+ aromatics as discussed below.

TABLE III.—EFFECT OF REACTOR BORE DIAMETER AND FLOW RATE ON RESPONSE TIME*

| | Time factor | | | |
|---|---|---|---|---|
| | Equilibrium time (sec.) a | | Recovery time (sec.) b | |
| Flow rate, c.f.h. | 0.5–1.0 | 1.5 | 0.5–1.0 | 1.5 |
| Reactor diameter inches: | | | | |
| .62 | 150 | | 150 | |
| .33 | 91 | | 60 | |
| .25 | 42 | | 43 | |
| .19 | 20 | | 20 | |
| .125 | 6 | 5 | 12 | 10 |
| .066 | | 3.5 | | 7 | a Time from initial response to 90% of plateau level.
b Time for 90% recovery to base ine from plateau level after initial response to sampling termination.
* Using HC's and conditions that minimize inlet system hangup or slow oxidation processes. Essentially all effects over 3 sec. are believed due to heat transfer processes. Flow Rate:~1 c.f.h., bed temp.~650° F.

Results obtained on C7+ aromatics where inlet condensation or sorption was not important are given in Table IV. These results seem to indicate that the recovery time lengthens (a tailing effect) with vanadia catalyst, presumably due to slow oxidation of reaction products. This would be objectionable where rapid and accurate response to streams containing such aromatics is required. Results on vehicle exhaust show lesser effects of this type corresponding to decreased aromatic content. This effect also decreases with increasing catalyst temperature above 650° F. and with decreasing distances between the probe and catalytic bed inlet. This effect may also be decreased slightly by increasing the flow rate.

The oxygen level which is normally determined by the air/sample ratio was found to have an important effect in the case of vehicle exhaust. Operation at air/sample ratios less than 1/3 with vanadia-alumina catalyst lead to a measurable decline in the magnitude of response with usage. When the sample of vehicle exhaust gas was replaced with air, a temporary large thermal response was observed, presumably due to the oxidation of residual organic material collected on the catalyst. The latter behavior is, of course, undesirable and was seldom observed with the air/sample ratio exceeded unity using a vanadia-alumina catalyst. At air/sample ratios in excess of one, the magnitude of thermal response was proportional to the fraction of the sample in the mixture.

TABLE IV.—NINETY PERCENT BASE LINE RECOVERY TIME FOR TOLUENE AND XYLENE AT VARIOUS CONDITIONS

| | Catalyst | | | | | | |
|---|---|---|---|---|---|---|---|
| | Vanadia-alumina | | | | | Chromia-alumina | |
| Flow rate, c.f.h | 0.5 | | 1.5 | | | 1.5 | |
| Probe position inches from inlet | .08 | | .08 | .20 | | .20 | |
| | Seconds to recover 90 percent | | | | | | |
| | T | X | T | X | T | X | |
| Catalyst temp., ° F.: | | | | | | | |
| 500 | | | | | 50 | | |
| 550 | | | | | | | |
| 575 | | | | | 40 | | |
| 600 | | | | | 50 | | |
| 625 | | | 42 | 32 | | 10 | |
| 650 | 30 | 60 | 35 | | 70 | | |
| 675 | 27 | | 28 | | | | |
| 750 | 20 | 25 | | | | | |

Note.—T=Toluene, 20 sec. exposure to 1.16% C vapor; X=Xylene, 20 sec. exposure to 0.35% C Vapor.

A retention of organic material in the inlet to the reactor caused by condensation or sorption presents serious problems in the case of vehicle exhaust analysis. For this reason, the pump 118 is placed downstream of the reactor rather than upstream thereof since most presently available pumps adsorb or condense organic materials. Procedures now in use involve the provision of troublesome filters and water condensers which can eliminate substantial and important fractions of organic matter including aldehydes and some higher aromatics. Since this invention is particularly responsive to these components and a major objective of this invention is their complete measurement, efforts were made to find conditions that would enable analysis of the complete sample. It was found that by the use of proper combinations of the air/sample ratio, combustion air moisture content and sampling line temperature that this objective could be achieved. It appears that so long as the gas stream is kept above the dew point and a nonsorbing sampling line is used, satisfactory response and recovery times are realized. The minimum sample line temperature necessary to keep the air-sample mixture above the dew point are illustrated by the typical values given in Table V.

TABLE V.—CONDITIONS NECESSARY TO BE ABOVE THE DEW POINT

| Min. sample line temp.,* C. | Air relative humidity, percent | Ambient temp., ° C. | Air/sample ratio |
|---|---|---|---|
| 30 | 50 | 20 | 2 |
| 35 | 50 | 35 | 2 |
| 40 | 50 | 30 | 1 |
| 34 | 50 | 30 | 2 |
| 30 | 50 | 30 | 4 |
| 30 | 0 | 30 | 2 |
| 38 | 100 | 20 | 2 |

* Calculated for typical exhaust using the relationship:

$$P_m = \frac{P_a \times RH \times A/R}{(A/S+1)} + \frac{P_{H_2O}}{A/S+1}$$

where:
$P_a$=Vapor pressure of water at ambient temperature
RH=Relative humidity
A/S=Ratio of combustion air to sample
$P_{H_2O}$=Water vapor pressure in raw exhaust gas for which a value of 100 mm. Hg is assumed
$P_m$=Dew point water vapor pressure
Min. sample line temp.=Temp. where liquid water has a vapor pressure of $P_m$ Little or no heating of the conduit section 42 is generally required during analysis of vehicle exhausts if a high ratio of dry combustion air to the sample is used. Another parameter that may affect sorption of organic material in the conduit section 42 is the flow rate through the conduit means 20. Although it is difficult to distinguish sample line effects from catalyst effects, it appears that the former are slightly less of a problem at 1.5 c.f.h. than at .5 c.f.h. High ratios of air/sample generally effect a significant improvement in response and recovery times.

Irreversible decrease of response with prolonged exposure to exhaust gases

It is well known that the lead products in vehicle exhausts, derived from lead additives in fuel, can irreversibly poison oxidation catalysts by a lead compound deposition in the outer pore structure. In view of the small amount of catalyst prior to the probe this may be expected to be a serious problem. It was studied at four temperature levels by continuous flow of sample and air through the catalyst bed with results being shown in Table VI. These results appear to show no substantial catalyst poisoning at temperatures below 750° F. Above this, some slow permanent loss in response may be expected. It is speculated that only when the lead compounds are molten or have appreciable vapor pressure do they deposit on the catalyst and thereby act as a poison. It should be abundantly apparent that ten hours of measuring time, as provided by a reactor temperature of 700° F., provides for the measurement of a considerable number of samples since the catalyst bed is exposed to the sample for less than about 30 seconds as shown in FIG. 4.

TABLE VI.—PERMANENT EFFECTS FROM PROLONGED CONTINUOUS EXPOSURE* TO IDLE EXHAUST FROM LEADED FUEL USING VANADIA-ALUMINA CATALYST

| | | | | |
|---|---|---|---|---|
| Reactor temperature, ° F | 625 | 650 | 700 | 750 |
| Probe position, inches from inlet, ⅛ inch bore | .20 | .08 | .08 | .08 |
| Air/sample ratio | 0.6 | 1.0 | 2 | 3 |
| Exposure time, hours | 5 | 2.5 | 10 | 5 |
| Percent decrease in response on standard mix | 5 | 5 | 5 | 5 |

*Total flow rate through instrument=1.5 c.f.h.; from tests made before and a few hours after exhaust exposure.

Response selectivity for various organic compounds

Figure 6:
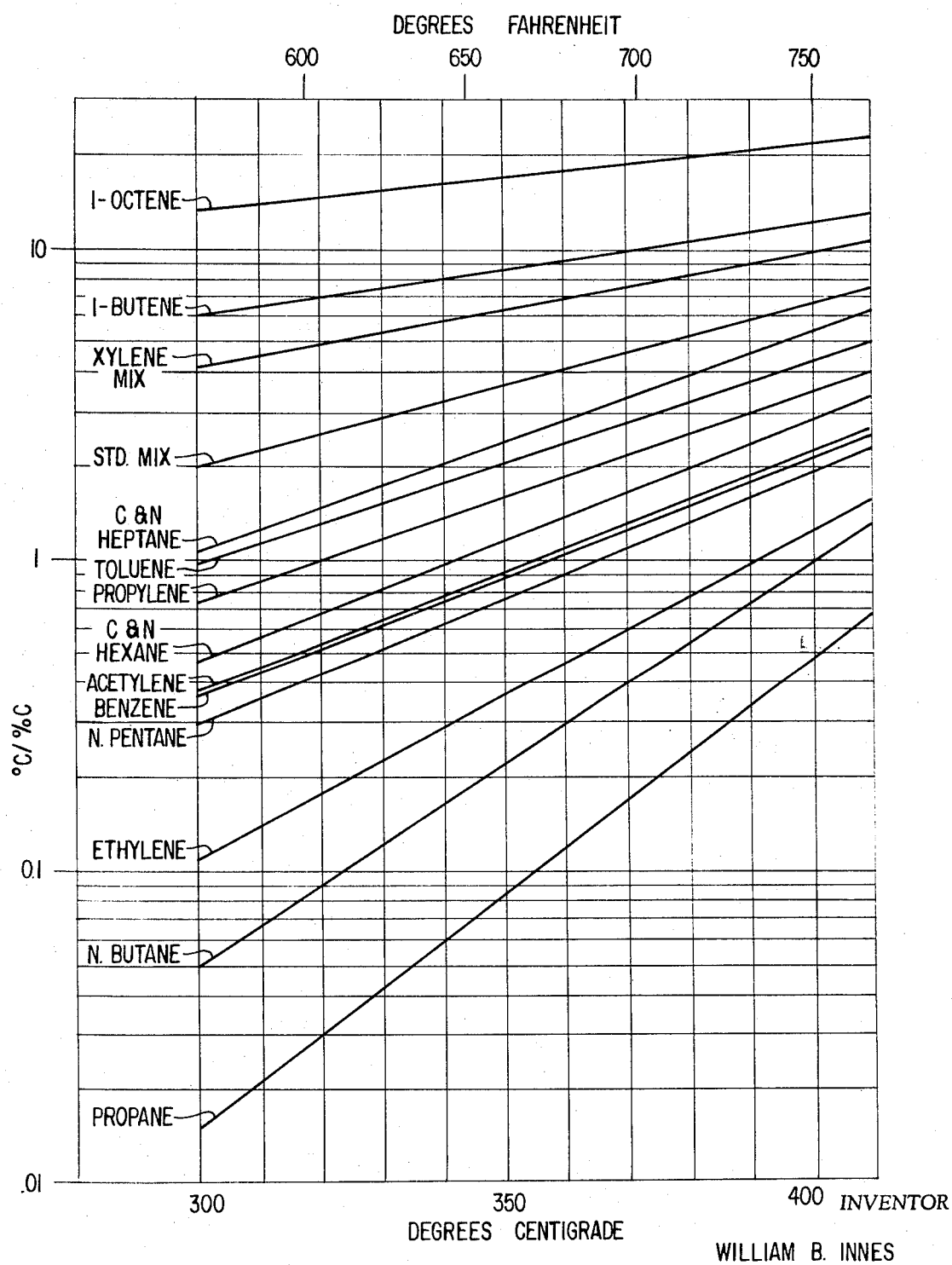

During the operation of this invention with a vanadia catalyst, it was found that a very large degree of discrimination in response was obtained depending upon the organic compound exposed to the catalyst. This probably reflects the inherent high oxidation selectivity of vanadia catalysts. The results are given in FIGS. 6–8 in terms of temperature rise per percent carbon for various compounds and operating temperatures with a vanadia-alumina catalyst according to Table I, a flow rate of 1.0 c.f.h. and reactor bore diameter 0.1 inch.

These results show that the photochemically reactive and objectionable components that need to be analyzed, such as formaldehyde, C4+ olefins and higher aromatics, give the greatest response. This selectivity is greatest at lower temperatures. The best correlation of photochemical reactivity with thermal response obtained by the reactor 60 appears to be in the range 660–710° F. Several types of test procedures were utilized in obtaining the relative carbon response data shown in FIGS. 6–8. Plotting this data obviously requires knowledge of both the relative thermal response upon oxidation and the original carbon content of the sample. Concentrations were selected so as to give responses in the range of .3–3° C. temperature rise and more than one concentration was used.

The light gas samples were tested by syringe injecting standardized gases or pure gases into a 375 cc. polyethylene squeeze bottle in such a way that all injected gas was retained and the balance was air. The carbon concentration is then easily calculated by the expression:

$$\text{Percent C} = \frac{\text{cc. gas injected} \times \text{C number} \times 100}{375}$$

High boiling point pure liquid organic materials were tested in the form of saturated vapors by bubbling air through the liquid and then drawing the saturated air through the sample inlet 30. The percent of carbon was calculated by the expression:

$$\text{Percent C} = \frac{100 \times \text{vapor pressure of liquid} \times \text{C number}}{\text{barometric pressure}}$$

The values for vapor pressure are obtainable from Chemical Engineering Handbook, Third Edition. This equation assumes a perfect gas, which is an approximation but quite acceptable at low pressures.

Vapor samples from low boiling point liquids were prepared by withdrawing a sample of saturated vapor from a saturator bottle with a syringe and injecting it into the 375 cc. squeeze bottle and thus diluting with air to 375 cc. The carbon concentration was calculated by the expression:

$$\text{Percent C} = \frac{100 \times \text{vapor pressure of liquid}}{\text{barometric pressure}} \times \frac{\text{cc. sat. vapor}}{375} \times \text{carbon number}$$

Mixtures of such as aqueous organics, gasolines and exhaust condensates were tested by injecting very small liquid samples (0–50 microliters) into a large (one gallon) glass container filled with dry air so as to theoretically completely vaporize the liquid. Organic absorption effects on the glass container wall are believed relatively small compared to organics in the gas phase since the surface area of the container is small and the container wall was warmed. The carbon content of the test gas is calculated using the following expression:

Percent C (gas)

$$= \frac{\frac{T}{273} \times \frac{760}{P} \times \frac{22{,}400}{} V(\text{liq.}) \times d(\text{liq.}) \times \text{percent C (liq.)} \times 100}{12 V_g}$$

where:

T = room temperature in ° abs.
$p$ = barometric pressure in mm. Hg
V (liq.) = volume of liquid
$d$ (liq.) = density of liquid g./cc.
Percent C (gas) = mol percent C if all organic as methane
Percent C (liq.) = wt. percent C in liquid
$V_g$ = volume of gallon container in cc.
12 = atomic weight of carbon The carbon content of vehicle exhaust gas was directly measured by the flame ionization method after condensation of water vapor. However, the absolute value of this is believed low because of the known low response of the flame ionization method to organic compounds containing carbonyl groups. The computed carbon basis response on a carbon basis for vehicle exhaust relative to response for the standard mix exceeds 100%, which implies that the level of harmful organics in vehicle exhaust are higher than expected since the standard mix was chosen to reflect what was thought to be typical reactivity. The high overall reactivity of exhaust may be attributed to the fractions missed by presently available analytical techniques. Analysis of water fractions condensed from the exhaust gas of an idling vehicle at 80° F. by this invention indicates that the condensed water accounts for about 20% of the total thermal response based on the following:

$$\frac{\text{HC in Condensate}}{\text{HC in dry Gas}} = \frac{H_2O \text{ vol.}}{\text{Dry gas vol.}}$$

$$\frac{\text{HC content of water vapor sample}}{\text{HC content of dry gas}}$$

Selectivity of response for reactive hydrocarbons vs. carbon monoxide and hydrogen In testing exhaust gas which generally has higher carbon monoxide and hydrogen than hydrocarbon combustibles, it is important to obtain selective response vs. the latter constituents. Table VII provides data indicating that the hydrocarbon selectivity for the process of this invention was found to be very good up to rather high temperatures.

TABLE VII.—EFFECT OF PARAMETERS ON CO AND $H_2$ RESPONSE RELATIVE TO STANDARD HC MIX

|  | Catalyst | | | | |
| --- | --- | --- | --- | --- | --- |
|  | Vanadia-alumina* | | Chromia-alumina* | Chromia* | Vanadia* |
|  | $H_2$ | CO | CO | CO | CO |
| Probe position, inches from inlet | .08 | .08 | .20 | 0.20 | 0.20 | .08 |
| Bed temp., ° F., 1.0–1.5 c.f.h.: | Percent response relative to standard HC mix on a carbon or mol percent ($H_2$) basis | | | | |
| 450 |  |  |  |  |  |
| 500 |  |  | 0.7 |  |  |
| 550 |  |  | 1.0 |  |  |
| 575 |  |  |  |  |  |
| 600 |  |  |  |  | 1.9 |
| 650 |  |  | 0.5 | 0.7 |  |
| 675 | 0.5 | 0.5 |  |  |  |
| 700 |  |  | 0.5 |  | 1.4 |
| 750 | 0.7 |  | 0.7 |  |  |
| 800 |  |  | 0.8 |  |  |

* Detail on catalysts given in Table I.

Linearity and additivity of response

Since the temperature rise obtained from the meter 102 must be calibrated and interpreted, it is desirable that the thermal response from different compounds be additive at any given reactor temperature and that the results obtained at different concentrations be linear. Laboratory data on various synthetic mixtures and varying concentrations using a vanadia-alumina catalyst are illustrated in Table VIII. These results show excellent linearity and additivity under optimum conditions such as a small volume of catalyst between the inlet 66 and the thermocouple tip 90, catalyst temperature in the range 625–775° F. and temperature rise less than 4° C. With the thermocouple tip 90 spaced .20 inch from the inlet 66, responses generally did not increase quite proportionately with concentration although deviations were small and consistent and may be readily correlated.

TABLE VIII.—LINEARITY AND ADDITIVITY WITH VANADIA-ALUMINA CATALYST

|  | Property | | | |
| --- | --- | --- | --- | --- |
|  | Average additivity | | Average linearity | |
| Flow ratio c.f.h | 0.5 | 1.5 | 0.5 | 1.5 |
| Probe position | .08 | .08   .20 | .08 | .08   .20 |
| Catalyst temp., ° F.: | Percent of theoretical response [c] | | | |
| 600 |  |  |  |  |
| 625 |  |  | 96 | [a]90 |
| 650 | [a]100 |  | [c]100 |  |
| 675 | [a]100 |  | [a]100 |  |
| 700 |  |  |  |  |
| 750 | [a]95 |  | [a]95 |  |

[a] Equal to 100% within reproducibility of test (5%) for various mixtures of butene, butane, propene and toluene up to at least 8° C.-temperature rise. Block temperature between 625–750° F.
[b] Values ranged from .75 to .95 for the nine organics tested; temperature rise up to 8° C.
[c] $R = V_1R_1 + V_2R_2$ where $V_1$=volume of 1st component and $R_1$ is the response per unit volume of 1st component.

I claim:

1. A device for determining the concentration of readily oxidizable ingredients in a gas sample comprising
    conduit means for receiving an oxidation supporting gas;
    means for continuously mixing a sample of the ingredients with the oxidation supporting gas at a predetermined ratio in the conduit means;
    heater means for elevating the temperature of the sample-oxidation supporting gas mixture above the dew point thereof;
    oxidizing means including a catalyst chamber having a flow path therethrough between .003–.018 square inch in cross section in communication with conduit means for oxidizing the ingredients and a heater for maintaining the catalyst chamber at a predetermined temperature in the range 500–900° F. prior to oxidation of the ingredients;
    means for passing between .3–10 c.f.h. of sample-oxidation supporting gas through the catalyst chamber; and
    means for measuring temperature rise in the catalyst chamber at a location between .03–.30 inch from the chamber inlet resulting from the oxidation of the ingredients.

2. The device of claim 1 wherein the mixing means comprises means for injecting the sample at a predetermined location, and the conduit means, between the predetermined location and the oxidizing means, comprises a conduit section incapable of sorbing the ingredients.

3. The device of claim 2 wherein the conduit section comprises tubing made of materials selected from the group consisting essentially of polyfluoroethylene and nylon.

4. The device of claim 1 wherein the mixing means comprises means for injecting the sample at a predetermined location and the heater means is arranged adjacent the predetermined location for elevating the temperature of the sample-oxidation supporting gas mixture above the dew point thereof.

5. The device of claim 4 wherein the heater means comprises a resistive element in the conduit means and means for delivering electrical energy to the resistive element.

6. The device of claim 1 wherein the temperature rise measuring means comprises a temperature probe extending into the catalyst chamber and occupying not more than about 60% of the cross-sectional area thereof.

7. The device of claim 1 wherein the passing means comprises pump means, downstream of the oxidizing means, operatively connected to the conduit means for drawing the oxidation supporting gas and the sample therethrough.

8. A process for determining the concentration of a readily oxidizable material in a gas sample comprising the steps of
    mixing the sample and an oxidation supporting gas at a predetermined ratio below 1:1 sufficient to support substantially complete oxidation thereof;
    continuously passing the mixture at .3–10 c.f.h. through conduit means to a catalyst chamber heated to a predetermined temperature in the range 500–900° F. and having a cross-sectional area between .003 and .018 square inch;
    measuring the equilibrium temperature rise in the range of 0–20° C. in the catalyst with a probe positioned downstream of the chamber inlet a distance of .03–.30 inch; and oxidizing the material in the chamber until the temperature of the probe reaches substantial equilibrium.

9. The process of claim 8 further comprising the step of maintaining the mixture above the dew point thereof.

10. The process of claim 9 wherein the mixing and maintaining steps comprise mixing a sample of given humidity and an oxidation supporting gas of substantially lower humidity at ratios above about 1:4.

11. The process of claim 9 wherein the maintaining step comprises heating the mixture upstream of the catalyst chamber above the dew point thereof.

12. The process of claim 9 wherein the mixing and maintaining steps comprise mixing a sample of given humidity and an oxidation supporting gas of substantially lower humidity at ratios of above 1:2; and heating the mixture upstream of the catalyst chamber above the dew point thereof.

References Cited

UNITED STATES PATENTS

| | | | |
|---|---|---|---|
| 3,537,823 | 11/1970 | Innes | 23—232 R |
| 3,547,587 | 12/1970 | Innes | 23—232 E |
| 2,531,592 | 11/1950 | Yant et al. | 23—232 E |
| 2,429,694 | 10/1947 | King | 23—232 R |
| 2,591,759 | 4/1952 | Zaikowsky | 23—255 EX |

JOSEPH SCOVRONEK, Primary Examiner

U.S. Cl. X.R.

23—230 PC, 253 PC, 255 E